(12) United States Patent
Sant et al.

(10) Patent No.: US 12,338,177 B2
(45) Date of Patent: Jun. 24, 2025

(54) CONTROLLED AND EFFICIENT SYNTHESIS OF INORGANIC-ORGANIC COMPOSITE CEMENTATION AGENTS WITH ENHANCED STRAIN CAPACITY

(71) Applicant: The Regents of the University of California, Oakland, CA (US)

(72) Inventors: Gaurav Sant, Los Angeles, CA (US); Dante A. Simonetti, Los Angeles, CA (US); Richard B. Kaner, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 825 days.

(21) Appl. No.: 17/436,961

(22) PCT Filed: Mar. 6, 2020

(86) PCT No.: PCT/US2020/021584
§ 371 (c)(1),
(2) Date: Sep. 7, 2021

(87) PCT Pub. No.: WO2020/181269
PCT Pub. Date: Sep. 10, 2020

(65) Prior Publication Data
US 2022/0169569 A1 Jun. 2, 2022

Related U.S. Application Data

(60) Provisional application No. 62/815,255, filed on Mar. 7, 2019.

(51) Int. Cl.
  *C04B 24/24* (2006.01)
  *C04B 28/00* (2006.01)
  *C04B 40/00* (2006.01)

(52) U.S. Cl.
  CPC ............ *C04B 28/006* (2013.01); *C04B 24/24* (2013.01); *C04B 40/0067* (2013.01); *C04B 40/0071* (2013.01); *C04B 40/0082* (2013.01)

(58) Field of Classification Search
  CPC ... C04B 28/006; C04B 24/24; C04B 40/0067; C04B 40/0071; C04B 40/0082; C04B 28/021; C04B 20/026; C04B 28/005; C04B 28/08; C04B 28/188; C04B 14/06; C04B 24/2652; C01B 33/26; C01B 39/02
  USPC .......................................................... 524/2
  See application file for complete search history.

(56) References Cited

U.S. PATENT DOCUMENTS

| | | | |
|---|---|---|---|
| 5,531,824 A * | 7/1996 | Burkes | C04B 41/009 427/427 |
| 2003/0010258 A1 | 1/2003 | Fukada et al. | |
| 2007/0029088 A1 | 2/2007 | Di Lullo Arias et al. | |
| 2009/0301352 A1 | 12/2009 | Constantz et al. | |
| 2012/0015524 A1 * | 1/2012 | Taylor | H01L 21/02101 438/746 |
| 2012/0094879 A1 * | 4/2012 | Roberts | C10G 3/42 508/459 |
| 2014/0255297 A1 | 9/2014 | Musyoka et al. | |
| 2017/0113170 A1 * | 4/2017 | Kitagawa | B01D 46/0032 |

FOREIGN PATENT DOCUMENTS

| | | |
|---|---|---|
| CN | 103480411 A | 1/2014 |
| WO | WO-99/46215 A1 | 9/1999 |
| WO | WO-2018/111209 A1 | 6/2018 |

OTHER PUBLICATIONS

Callagon La Plante, et al., "Enhancing Silicate Dissolution Kinetics in Hyperalkaline Environments," J. Phys. Chem. C 2019, 123, pp. 3687-3695.
Diez-Garcia, M. et al., "Ultra-Fast Supercritical Hydrothermal Synthesis of Tobermorite under Thermodynamically Metastable Conditions," Angew. Chem. 2017, 129 (12), pp. 3210-3215.
International Search Report and Written Opinion on PCT Application No. PCT/US2020/021584 dated Jun. 9, 2020, 13 pages.
Keller et al., "Dissolved products of artificially pulverized silicate minerals and rocks; Part II" Journal of Sedimentary Research, vol. 33, No. 2, Jun. 1, 1963, abstract, 8 pages.
Liu et al., "Continuous flow synthesis of ZSM-5 zeolite on the order of seconds" PNAS, vol. 113, No. 50, Dec. 13, 2016, pp. 14267-14271.
Wei, Z. et al., "Isothermal Stimulation of Mineral Dissolution Processes by Acoustic Perturbation," J. Phys. Chem. C 2018, 122, pp. 28665-28673.
Iyer et al., "Hybrid Organic-Inorganic Composites Based on Glycolyzed Polyurethane", ACS Sustainable Chemical Engineering: pp. 1-8 (2022).

\* cited by examiner

*Primary Examiner* — Hannah J Pak
(74) *Attorney, Agent, or Firm* — Foley Hoag LLP; David P. Halstead; Alexander J. Chatterley

(57) ABSTRACT

Provided herein are manufacturing processes that include (1) subjecting precursor-containing solids to dissolution under acoustic perturbation to yield an initial slurry including dissolved precursors; (2) subjecting the initial slurry to hydrothermal synthesis to yield a subsequent slurry including siliceous solids formed from the dissolved precursors; and (3) subjecting the subsequent slurry to cementation to yield a cemented siliceous solid. Also provided herein are cemented siliceous solids formed by the manufacturing processes.

16 Claims, 7 Drawing Sheets

CONTROLLED AND EFFICIENT SYNTHESIS OF INORGANIC-ORGANIC COMPOSITE CEMENTATION AGENTS WITH ENHANCED STRAIN CAPACITY

CROSS-REFERENCE TO RELATED APPLICATIONS

This application is a National Stage Entry of International Application No. PCT/US2020/021584, filed Mar. 6, 2020, which claims the benefit of U.S. Provisional Patent Application No. 62/815,255, filed Mar. 7, 2019, which are incorporated by reference herein in its entirety.

BACKGROUND

The following description of the background is provided simply as an aid in understanding the present disclosure and is not admitted to describe or constitute prior art to the present disclosure.

Concrete and ordinary portland cement (OPC) production often is subject to unsustainable energy and embodied carbon dioxide ($CO_2$) intensity. Producing OPC is highly energy-intensive, involving > about 5000 J/g of energy in the form of heat, and an additional about 600 J/g of energy for grinding. This is an untenable energy and $CO_2$ burden for a material that is manufactured at the scale of about 4.1 B tonnes per year of OPC, and > about 30 B tonnes per year of concrete, globally. The production and use of OPC is therefore currently responsible for about 9% of anthropogenic $CO_2$ emissions.

Concrete and ordinary portland cement (OPC) production often is also subject to passive chemical reactions. OPC reacts with water at standard temperature and pressure to form a cemented solid. However, there is insufficient ability to actively control or drive OPC's reaction rates. This results in: (a) an inability to control evolution of microstructure and properties, and (b) an over-reliance on highly-trained and quality labor to ensure durable construction.

Concrete and ordinary portland cement (OPC) production often is also subject to racking sensitivity and compromised durability. Cracking of reinforced concrete is currently unavoidable. These cracks may be problematic, as they allow faster transport of moisture and ions into concrete, which initiate deleterious reactions that compromise durability and structural service-life.

It is against this background that a need arose to develop the embodiments described herein.

SUMMARY

Provided herein are manufacturing processes for forming cemented siliceous solids.

Some embodiments of the present disclosure include a manufacturing process comprising: subjecting precursor-containing solids to dissolution under acoustic perturbation to yield an initial slurry including dissolved precursors; subjecting the initial slurry to hydrothermal synthesis to yield a subsequent slurry including siliceous solids formed from the dissolved precursors; and subjecting the subsequent slurry to cementation to yield a cemented siliceous solid. In some embodiments, the process further comprising subjecting initial precursor-containing solids to pulverization to form pulverized precursor-containing solids, and wherein dissolution is performed on the pulverized precursor-containing solids. In some embodiments, subjecting the precursor-containing solids to dissolution is performed in a sonoreactor. In some embodiments, subjecting the precursor-containing solids to dissolution is performed at a non-zero ratio of the solids to water, on mass basis, of less than about 1. In some embodiments, subjecting the precursor-containing solids to dissolution includes exposing the solids to acoustic perturbation at a frequency f in a range of about 2 Hz≤f≤about 200 kHz. In some embodiments, subjecting the precursor-containing solids to dissolution is performed at a temperature less than about 100° C. In some embodiments, subjecting the precursor-containing solids to dissolution is performed at a pressure of about 1 atm. In some embodiments, subjecting the initial slurry to hydrothermal synthesis is performed in a flow reactor. In some embodiments, subjecting the initial slurry to hydrothermal synthesis is performed at a pressure p in a range of about 0.1 MPa≤p≤about 25 MPa. In some embodiments, subjecting the initial slurry to hydrothermal synthesis is performed at a temperature T in a range of about 20° C.≤T≤about 400° C. In some embodiments, subjecting the subsequent slurry to cementation is performed in a cementation reactor. In some embodiments, subjecting the subsequent slurry to cementation includes combining an organic additive with the subsequent slurry. In some embodiments, combining the organic additive with the subsequent slurry is performed at a non-zero ratio of the organic additive to the siliceous solids, on mass basis, of about 1 or less. In some embodiments, the organic additive is a polymeric additive.

Other embodiments include a cemented siliceous solid formed by the manufacturing process of any of the embodiments disclosed herein.

DETAILED DESCRIPTION

Embodiments of this disclosure are directed to a process that improves upon concrete and ordinary portland cement (OPC) production, and cemented siliceous solid formed by these manufacturing processes.

In an aspect according to some embodiments, a manufacturing process includes:
(1) subjecting precursor-containing solids to dissolution under acoustic perturbation to yield an initial slurry including dissolved precursors;
(2) subjecting the initial slurry to hydrothermal synthesis to yield a subsequent slurry including siliceous solids formed from the dissolved precursors; and
(3) subjecting the subsequent slurry to cementation to yield a cemented siliceous solid.

In some embodiments of the manufacturing process, the process includes subjecting initial precursor-containing solids to pulverization to form pulverized precursor-containing solids, and dissolution is performed on the pulverized precursor-containing solids.

Figure 1:
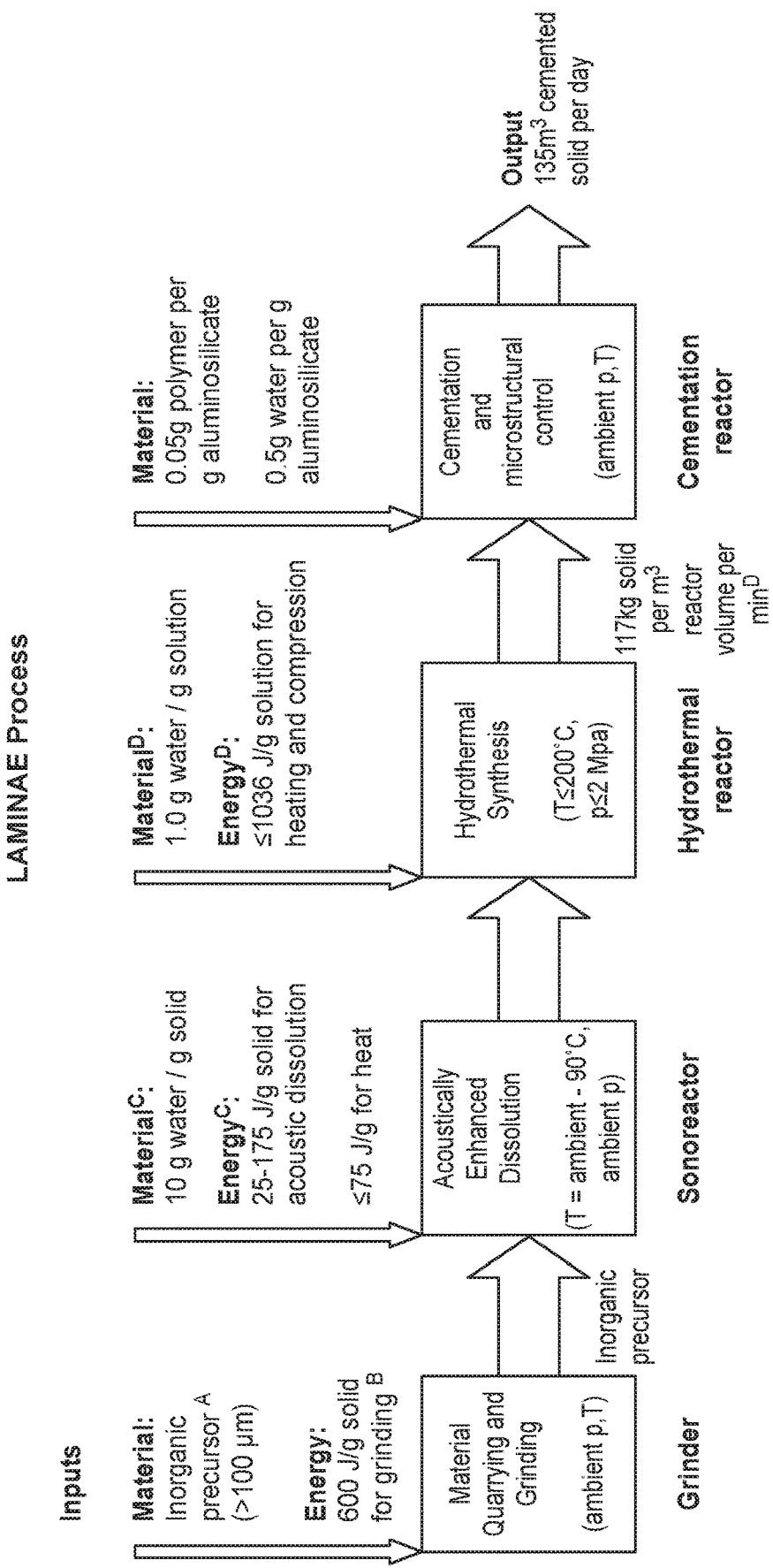
FIG. 1 provides a block flow diagram for an improved process (referred to as LAMINAE process) with material and energy inputs. The process utilizes precursors that are activated in solution leading to the precipitation of cementing compounds. This analysis assumes a dissolution dilution ratio of about 1:10 (solid:liquid, mass basis) and the energy for acoustic dissolution is about 2% of the bond strength of the solute (e.g., about 45 J/g for calcite). The hydrothermal reactor's space time yield is based on a flow reactor with about 6 minutes contact time and production ratio of about 0.07 g solid per g solution. The yield indicated therein, about 135 m³ of cemented solid per day, corresponds to the production of about 300 tonnes of cementation agent which would allow the production of nearly about 1000 tonnes of concrete components at a single site, e.g., typical of a large precast concrete facility.

In some embodiments, the process integrates one or more of four primary stages (see, e.g., block flow diagram in FIG. 1) to produce hybridized cemented siliceous solids, which can be formed into a product in the manner of, e.g., precast concrete. Embodiments of these stages are described FIG. 1 and also as follows.

Material Quarrying and Grinding

Certain embodiments of the disclosure include subjecting initial precursor-containing solids to pulverization to form pulverized precursor-containing solids. In some embodiments, the cursor-containing solids comprise inorganic precursor-containing solids—initial or feed solids in the form of quarried geological materials (or minerals) (e.g., basalt, granite, sandstone, diorite, gabbro, limestone, dolomite, andesite, rhyolite, and so forth) and industrial wastes (e.g., slags, fly ashes, and so forth)—that are ground or pulverized into particles of a specified size distribution. In some embodiments, the initial precursor-containing solids are subjected to pulverization at ambient temperatures, e.g., about 15° C. to about 40° C. In some embodiments, the initial precursor-containing solids are subjected to pulverization at ambient pressure (e.g., about 1 atm). In some embodiments, the initial precursor-containing solids have a diameter of greater than 100 μm, e.g., greater than 100, 200, 300, 400, 500, 600, 700, 800, 900 or 1000 μm.

Acoustically Enhanced Dissolution

Certain embodiments of the disclosure include subjecting precursor-containing solids to dissolution under acoustic perturbation to yield an initial slurry including dissolved precursors. In some embodiments, the dissolution is performed on the pulverized precursor-containing solids. In some embodiments of the manufacturing process, subjecting the precursor-containing solids to dissolution is performed in a sonoreactor. In some embodiments of the manufacturing process, subjecting the precursor-containing solids to dissolution is performed at a non-zero ratio of the solids to water, on mass basis, of less than about 1, such as about 0.5 or less, about 0.4 or less, about 0.3 or less, about 0.2 or less, or about 0.1 or less. In some embodiments of the manufacturing process, subjecting the precursor-containing solids to dissolution includes exposing the solids to acoustic perturbation at a frequency f in a range of about 2 Hz≤f≤about 200 kHz. In some embodiments of the manufacturing process, subjecting the precursor-containing solids to dissolution is performed at a temperature less than about 100° C. In some embodiments of the manufacturing process, subjecting the precursor-containing solids to dissolution is performed at a pressure of about 1 atm.

Figure 2:
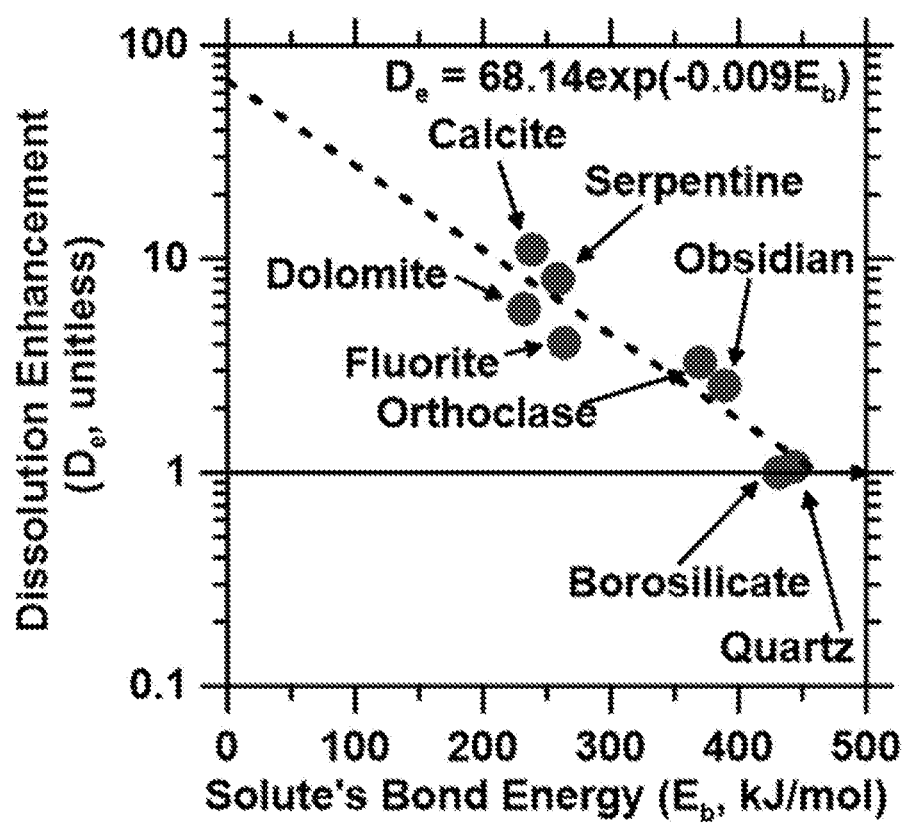
FIG. 2 provides dissolution enhancement produced by acoustic perturbation as a function of a solute's bond energy as compared to dissolution under conditions of convective mixing. The data is fitted by an Arrhenius-like expression $D_e = C \cdot \exp((-f/RT)E_b)$ where $D_e$ is the dissolution enhancement (unitless), C is a dissolution constant (68.14), f is a scaling factor (about 0.022, unitless), $E_b$ is the bond energy (kJ/mol), R is the gas constant, T is the temperature (25° C.).

By way of non-limiting example, in some embodiments, the ground or pulverized precursor-containing solids are fed into a broadband sonoreactor along with water, at a (non-zero) ratio of solid to liquid (water) (on mass basis) of about 1 or less, such as about 0.5 or less, about 0.4 or less, about 0.3 or less, about 0.2 or less, or about 0.1 or less. The sonoreactor can enhance precursor dissolution to a desired (optimal) dissolution rate by generating acoustic frequencies specific to an inorganic precursor material. Dissolution enhancement achieved by acoustic perturbation is a function of a solute's bond energy (FIG. 2). The broadband sonoreactor includes multiple piezoelectric actuators (e.g., composed of ceramics with different characteristic perturbation frequencies) driven via a function generator and a power amplifier. This allows stimulation at one or more frequencies (f) ranging from about 2 Hz≤f≤about 200 kHz to provide a balance between effective energy propagation and attenuation (which enhances with frequency). This stage outputs one or more solutions, each of which is undersaturated (saturation index<0) with respect to hydrated silicates (e.g., phillipsite, tobermorite, chabazite, and/or clinoptilolite), and includes undissolved solids at a water:solids ratio of about 1:1, which are then fed in the form of a slurry into a flow reactor in the next stage.

Hydrothermal Synthesis

Certain embodiments of the disclosure include subjecting the initial slurry to hydrothermal synthesis to yield a subsequent slurry including siliceous solids formed from the dissolved precursors. In some embodiments of the manufacturing process, subjecting the initial slurry to hydrothermal synthesis is performed in a flow reactor. In some embodiments of the manufacturing process, subjecting the initial slurry to hydrothermal synthesis is performed at a pressure p in a range of about 0.1 MPa≤p≤about 2 MPa or about 0.1 MPa≤p≤about 25 MPa. In some embodiments of the manufacturing process, subjecting the initial slurry to hydrothermal synthesis is performed at a temperature T in a range of about 20° C.≤T≤about 200° C. or about 20° C.≤T≤about 400° C.

By way of non-limiting example, in some embodiments, the undersaturated solutions from the sonoreactor are fed into an instrumented flow reactor for hydrothermal synthesis of siliceous solids. The hydrothermal reactor includes metallic (e.g., stainless-steel) tubes and compression fittings and high-pressure syringe pumps for controlled delivery of the solution. To overcome slow zeolite crystallization kinetics, the process can utilize pressurized hot water in a short contact time, tubular flow reactor. The intimate mixing of stoichiometrically populated precursor solutions at high linear velocities results in rapid heating that greatly enhances precipitation. This nature of ultrafast synthesis is demonstrated for both tobermorite and chabazite structures.

Figure 3:
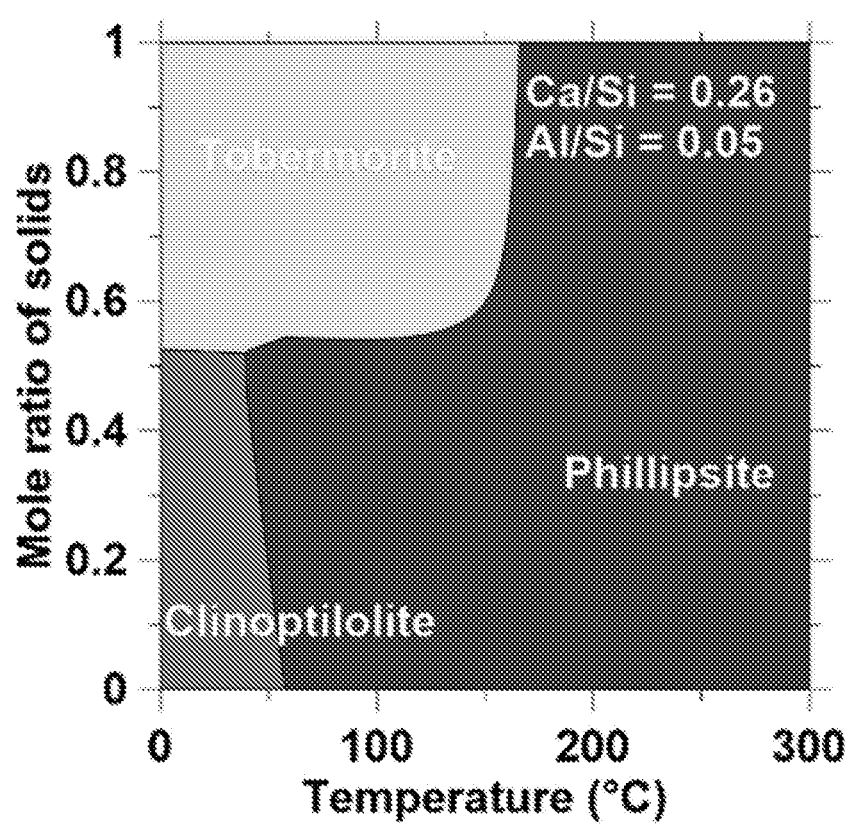
FIG. 3 provides effect of temperature on distributions of hydrated silicates for a constant composition of a precursor solution computed using Gibbs Energy minimization solver (GEM-Selektor v3.4: GEMS).

As operating conditions and precursor stoichiometry are parameters controlling the cementitious siliceous solids formed in this stage (FIG. 3), temperature and pressure are controlled via proportional-integral-derivative controllers (PIDs) using resistively heated furnaces and pressure regulators. Operating conditions are adjusted to ensure rapid reaction kinetics and reduce reactor residence times, within a range of about 0.1≤p (MPa)≤about 2.0 and about 20≤T (° C.)≤about 200. Reactor operation maintains a saturated slurry (saturation index=0), while producing siliceous solids with desired morphologies and phase assemblages, which are then input into a cementation reactor in the next stage.

Cementation and Microstructural Control

Certain embodiments of the disclosure include subjecting the subsequent slurry to cementation to yield a cemented siliceous solid. In some embodiments of the manufacturing process, subjecting the subsequent slurry to cementation is performed in a cementation reactor. In some embodiments of the manufacturing process, subjecting the subsequent slurry to cementation includes combining an organic additive with the subsequent slurry. For example, the organic additive may be one or more polymeric additive based on polysaccharides (e.g., chitosan, alginates, and so forth), synthetic polyelectrolytes (e.g., polyallylamine hydrochloride (PAH)), siloxanes (e.g., polydimethylsiloxane (PDMS)), rubbers (e.g., cis-1,4-polyisoprene (PI)) and water-soluble monomers (e.g., siloxanes, isoprene, and so forth). In some embodiments of the manufacturing process, combining the organic additive with the subsequent slurry is performed at a non-zero ratio of the organic additive to the siliceous solids, on mass basis, of about 1 or less, such as about 0.5 or less, about 0.4 or less, about 0.3 or less, about 0.2 or less, or about 0.1 or less. In some embodiments of the manufacturing process, the organic additive is a polymeric additive.

Figure 4:
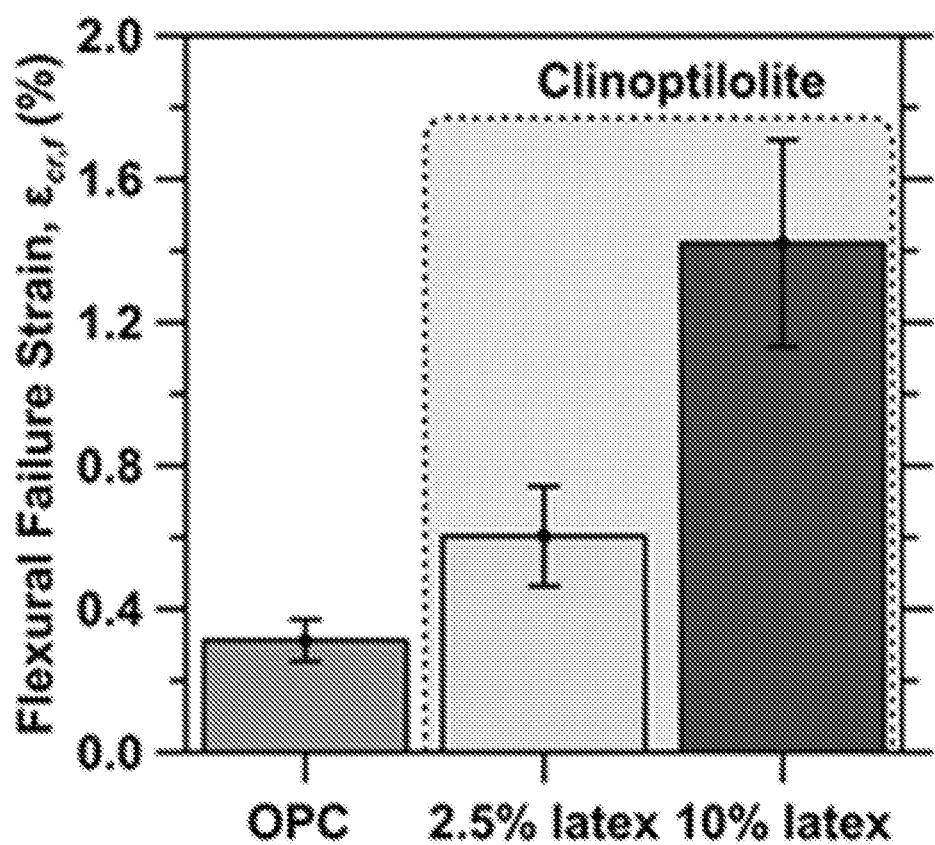
FIG. 4 provides critical flexural strain of inorganic-organic (clinoptilolite-latex) nanocomposite compared to an OPC matrix formed at same solid content. After about 24 hours of aging at about 25° C. the hybrid composite features a strain capacity that is about 5x greater than the OPC counterpart. The enhanced strain capacity is believed to result from elastic mismatch in the microstructure, which localizes damage in stiff inorganic regions and suppresses crack propagation by deflection and blunting.

In some embodiments, the saturated slurry passes from the hydrothermal reactor to the cementation reactor, into which one or more polymeric additives with compositions based on polysaccharides (e.g., chitosan, alginates, and so forth), synthetic polyelectrolytes (e.g., polyallylamine hydrochloride (PAH)), siloxanes (e.g., polydimethylsiloxane (PDMS)) or rubbers (e.g., cis-1,4-polyisoprene (PI)) are added. Typical dosages are on the order of about 0.05 g of polymeric additive per g of siliceous solid, and, more generally, a (non-zero) ratio of polymeric additive to siliceous solid (on mass basis) is about 1 or less, such as about 0.5 or less, about 0.4 or less, about 0.3 or less, about 0.2 or less, or about 0.1 or less. The formation of hybrid microstructures is achieved by solution-controlled phase agglomeration where the specific adsorption of organic constituents on pre-formed and growing precipitates (nucleated particles from the saturated solution) induces bonding and stiffness mismatch at joining interfaces. The resulting induction of a stiffness mismatch and discontinuity at the joining interfaces allow ductility and resistance to strain localization (as evidenced by improved cracking behavior, see FIG. 4). Alternatively, or in conjunction, organic additives can be added as water-soluble monomers (e.g., siloxanes, isoprene, and so forth), with polymerization performed in the suspension.

Embodiments of these processes can integrate the various stages of acoustically enhanced dissolution, hydrothermal synthesis and microstructure control in a single, series process wherein a material flow proceeds from one stage to the next in a continuous manner. This process can also include, as a final stage, flow into component molds (e.g., for producing castable components such as beams, columns, or slabs).

Embodiments of these processes can encompasses one or more advantageous aspect (e.g., low-temperature activation of precursor materials, active control of reactions by hydrothermal synthesis, and active control and design of hybrid microstructures) to develop an improved approach to fabrication of cemented solids with enhanced properties. The use of acoustic stimulation (e.g., ultrasonication) to enhance dissolution rates of aluminosilicates included in geological materials and industrial wastes at sub-boiling temperatures (e.g., less than about 100° C. or about 90° C. to about 20° C.) and at ambient pressure (e.g., about 1 atm) is an advantageous, energy efficient stage. Activation of these abundant precursor materials can reduce the energy to process raw materials relative to comparative cements, primarily by omitting a high energy and $CO_2$ intensive process of heating. Acoustic stimulation releases ionic constituents of the inorganic precursors at lower energies, namely about 25-175 J/g for the acoustically assisted dissolution of the precursors and up to about 75 J/g for heat.

Hydrothermal synthesis of initial slurry including dissolved precursors (e.g., zeolites) can be conducted under ultrafast (e.g., within about 10 s to about 1000 s) continuous flow conditions to yield cementitious solids. This method of synthesis involves substantially less energy inputs than cement production. About 1050 J/g of energy to heat and pressurize aqueous solutions for hydrothermal flow synthesis, and energy for in-line mixing (≤ about 150 J/g) are involved for this stage of the process. This yields a cumulative thermodynamic energy intensity of about 2000 J/g. Conservatively this yields a nearly 50% reduction in energy use as compared to the comparative practice of OPC production at scale, assuming an about 50% inefficiency factor. Operation within in-line continuous flow reactors provides higher throughput than batch processes, which will be included to meet scale demands of concrete production. Additionally, this process provides an elevated degree of control on the reaction process, as the temperature, pressure and flow-rate can be closely controlled to influence the selectivity of phases formed in the flow reactor. Control of the phases formed can provide a higher level of control for the service-life of the materials produced.

In another aspect according to some embodiments, a cemented siliceous solid is formed by the manufacturing process of any of the foregoing embodiments.

Allowing hybrid microstructure design via solution-controlled phase aggregation can yield greatly enhanced ductility and fracture-resistance, yielding improved tensile capacity, resistance to microcracking and superior durability vis-à-vis OPC-based compositions. Such improvements are unprecedented in comparative cementitious formulations, due to the lack of adequate control on microstructure, and inadequate capability for incorporating organic additives.

ADDITIONAL INFORMATION

Concrete, a mixture of ordinary Portland cement (OPC), sand, stone, water and chemical admixtures, forms the basis of modern infrastructure. While ubiquitous, concrete and the primary cementation agent on which it is based, OPC, feature deficiencies including: (a) unsustainable energy and $CO_2$ intensity, (b) passive chemical reactions which provide insufficient ability for control of microstructure, and (c) compromised durability due to its tendency to (micro)crack.

Figure 5:
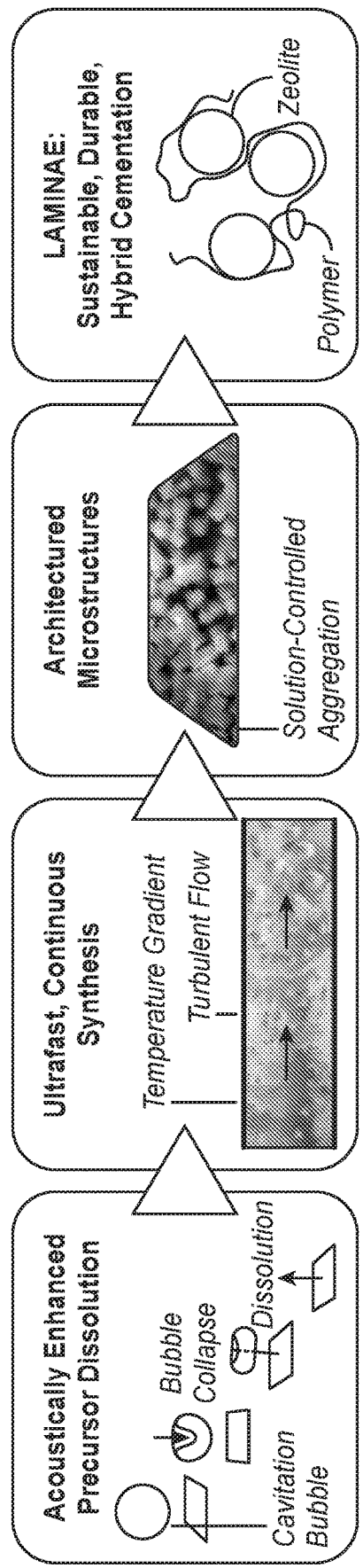
FIG. 5 provides an illustration of the LAMINAE process which delivers an energy-efficient and highly durable cementation solution.

The intense thermal activation of carbonate-silicate-aluminate mixtures (e.g., about 1500° C.) lies at the origin of the tremendous energy and $CO_2$ intensity of OPC production. Therefore, an improved process proposes a low-temperature approach based on acousto-hydrothermal synthesis for the ultrafast aqueous mobilization of ionic constituents from abundant alkaline silicate-aluminate precursors, and the synthesis of cementitious solids (see FIG. 5). The cementitious compositions thus formed are composed of hydrous aluminosilicates that incorporate alkali/alkaline light metals for valence compensation (of aluminosilicate groups) and that feature the ability to be organized into ductile, fracture-tolerant hybrid architectures.

The improved process, termed low-temperature architected cementation agents or "LAMINAE", provides transformative cementation solutions, with focus on fulfilling one or more of the following objectives:
1) Ensuring low-temperature activation: stoichiometric additive-free pathways based on acoustic stimulation for the aqueous activation of geological precursors and industrial wastes at sub-boiling temperatures and at ambient pressure,
2) Achieving active reaction control: pathways for ultrafast (e.g., within about 10 s to about 1000 s) synthesis of cementitious siliceous or zeolitic solids (e.g., phillipsite, tobermorite, chabazite, and clinoptilolite) in a flow reactor under thermodynamically metastable conditions, and,
3) Providing hybrid microstructure design: methods for architecting microstructures, e.g., via solution-controlled phase aggregation, wherein inorganic siliceous constituents are bridged and jointed by ductility-enhancing, and fracture-resisting polymeric additives.

LAMINAE can be a solution for one or more of the following, and in some embodiments, the methods and compositions of the present disclosure solve one or more of the following.
1) Ensuring the low-temperature activation of precursor components that are geologically sourced (e.g., basalt, granite, and sandstone, diorite, gabbro, limestone, dolomite, andesite, rhyolite, and so forth) and/or that include alkaline industrial wastes (e.g., slags, fly ashes, and so forth). Between current production and historical reservoirs, the U.S. hosts> about 200 M tonnes of slags and > about 1.8 B tonnes of coal combustion residuals such as fly ash, and 2) Ultrafast synthesis—by stoichiometric control—of siliceous solids, such as, hydrated alkali/alkaline aluminosilicates that show cementitious attributes including:
phillipsite [$(Ca,Na_2, K_2)_3Al_6Si_{10}O_{32}.12H_2O$],
tobermorite [$Ca_5Si_6O_{16}(OH)_2.4H_2O$],
chabazite [$(Ca,Na_2,K_2,Mg)Al_2Si_4O_{12}.6H_2O$], and
clinoptilolite [$(Na,K,Ca)_{2-3}Al_3(Al,Si)_2Si_{13}O_{36}.12H_2O$]),
and
which can be formed into hybrid (organic-inorganic, e.g., such as nacre) architectured microstructures that provide greatly enhanced ductility and hence durability.

Figure 6:
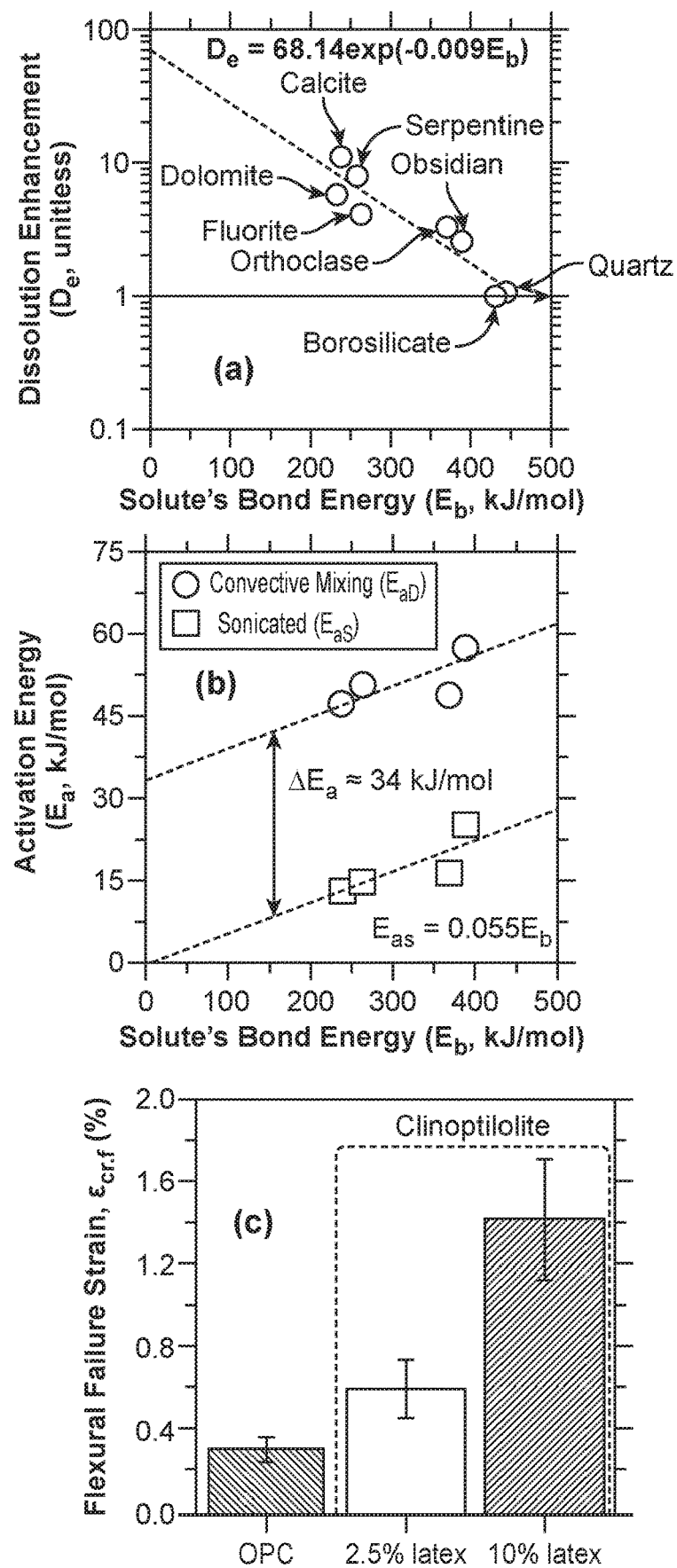
FIG. 6(a) shows dissolution enhancement produced by acoustic perturbation as a function of a solute's bond energy as compared to dissolution under conditions of convective mixing. The data is fitted by an Arrhenius-like expression $D_e = C \cdot \exp((-f/RT)E_b)$ where $D_e$ is the dissolution enhancement (unitless), C is a dissolution constant (68.14), f is a scaling factor (about 0.022, unitless), $E_b$ is the bond energy (kJ/mol), R is the gas constant, T is the temperature (25° C.).
FIG. 6(b) Shows the activation energy of dissolution under unsonicated and sonicated conditions. A linear scaling of activation energy and solute bond strength is seen wherein the difference in activation energy between unsonicated and sonicated conditions is constant, $\Delta E_a$ of about 34 kJ/mol.
FIG. 6(c) Shows critical flexural strain of inorganic-organic (clinoptilolite-latex) nanocomposite compared to an OPC matrix formed at same solid content. After about 24 hours of aging at about 25° C. the hybrid composite features a strain capacity that is about 5× greater than the OPC counterpart. The enhanced strain capacity results from elastic mismatch in the microstructure, which localizes damage in stiff inorganic regions and suppresses crack propagation by deflection and blunting.

These features are advantageous to reducing the energy and $CO_2$ intensity of cement processing, for example, by omitting processing to decarbonate limestone, and to develop cementation agents that feature enhanced ductility and cracking resistance. First, acoustic perturbation provides an energy-efficient manner for greatly enhancing the aqueous dissolution rate of a wide range of mineral and rock compositions—without a need for stoichiometric additives. Across a range of solutes, acoustic energy imparted at a level of about 2% of a solute's bond energy is sufficient to stimulate dissolution by greatly reducing the energy barrier to dissolution (see FIG. 6(*b*)). The extent of dissolution enhancement that results at ambient conditions, that is, up to about 12× for calcite at circumneutral pH (compared to conditions of convective mixing, e.g., see FIG. 6(*a*)), ensures that calcite (or iron and steel slag, or fly ash) dissolves—under acoustic perturbation—at a rate that is nearly corresponding to that of alite (MIII-$Ca_3SiO_5$); the dominant compound in OPC. This ability to enhance dissolution rates (without thermal activation) rapidly mobilizes a sufficient and diverse population of ions in solution, for example, from geological and industrial waste stream precursors, to induce hydrate precipitation.

Figure 7:
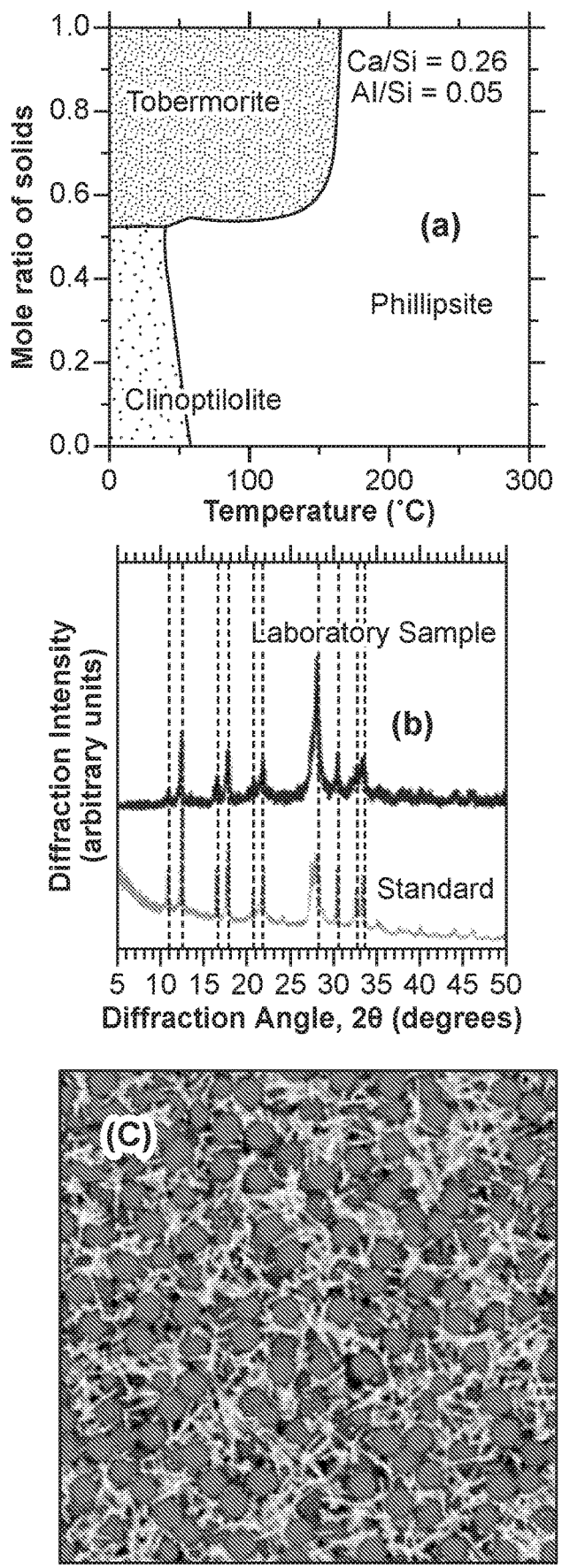
FIG. 7(a) shows the effect of temperature on the distributions of hydrated silicates for a constant composition of precursor solution computed using GEMS.
FIG. 7(b) shows X-ray diffraction pattern of synthetic phillipsite alongside a reference.
FIG. 7(c) shows a two-dimensional (2D)-microstructure that shows spherical and cylindrical hydrates. Solid percolation occurs at φ of about 0.72 exceeding the threshold for monodisperse spheres (φ of about 0.64). The high-aspect ratio particles allow for effective stress distribution.

Second, an aqueous pool of stoichiometrically banded ionic constituents created in the stage above can be introduced into an in-line continuous flow reactor, within which, siliceous solids, such as hydrated alkali/alkaline aluminosilicates are synthesized under thermodynamically metastable conditions in an ultrafast manner (e.g., in a matter of seconds to minutes; see FIG. 7(*b*) for phillipsite synthesized under batch synthesis meant to simulate the flow process). This approach facilitates the highly accelerated nucleation and growth (N&G) of cementing compounds, wherein hydrate growth continues (e.g., in the style of Ostwald ripening) upon exiting the reactor, and precipitation and solidification continue in the style of precast concrete production. This approach can allow operations such as polymeric additive dosage and dewatering to occur following the initial N&G stage allowing control of porosity, and geometrical organization of cementitious microstructures.

For example, the X-ray Diffraction (XRD) pattern in FIG. 7(*b*) shows substantially phase pure K, Na-Phillipsite ($K_{3.1}Na_{0.9}[Al_{11}Si_{12}O_{23}]$:$xH_2O$) synthesized by this ultrafast approach at about 100° C. and saturated steam pressure from stoichiometric precursors, wherein the batch synthesis meant to simulate the flow process. The product is composed of spherical aggregates of about 10 μm that is composed of individual crystallites with ≤ about 2 μm in diameter.

Third, in spite of their dominantly hydrophobic nature, water-based latex emulsions form stable mixtures when incorporated with (highly hydrophilic) hydrous aluminosilicates. Herein, the presence of water (see FIG. 6(*c*)) allows such compositions to react following compositing, and results in the formation of strong bridging bonds amongst dissimilar ("organic-inorganic") mixture components. As a result, these inorganic composites show greatly enhanced strain capacity; up to about 5× greater than OPC. Indeed, a rule of mixtures calculation indicates that the about 10% latex composited system shown in FIG. 6(c), if formed into a concrete (e.g., including coarse and fine mineral aggregates such as quartzite) would demonstrate a critical strain capacity ranging between about $0.7\% \leq \varepsilon_{cr} \leq$ about 1.4%.

As used herein "silicious solid" can comprise aluminosilicates, such as zeolitic solids. Particular examples include hydrated aluminosilicates that contain element(s) from Groups 1 and/or 2 of the periodic table. The solid may be amorphous or crystalline, such amorphous hydrated or dehydrated aluminosilicates and crystalline hydrated or dehydrated aluminosilicates. In some embodiments, crystalline materials have crystallite sizes of less than about 2 microns (e.g., less than 2 microns, less than 1 micron). Certain non-limiting examples include phillipsite, tobermorite, chabazite, clinoptilolite.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A manufacturing process for forming a cemented siliceous solid, comprising, in a continuous process:
    subjecting precursor-containing solids to dissolution under acoustic perturbation in a sonoreactor to yield an initial slurry including dissolved precursors;
    feeding the initial slurry into a flow reactor for hydrothermal synthesis and subjecting the initial slurry to hydrothermal synthesis to yield a subsequent slurry including siliceous solids formed from the dissolved precursors, wherein the initial slurry is subjected to hydrothermal synthesis for about 10 seconds to about 1000 seconds; and
    feeding the subsequent slurry into a cementation reactor and subjecting the subsequent slurry to cementation to yield a cemented siliceous solid.

2. The manufacturing process of claim 1, further comprising subjecting initial precursor-containing solids to pulverization to form pulverized precursor-containing solids, and wherein dissolution is performed on the pulverized precursor-containing solids.

3. The manufacturing process of claim 1, wherein subjecting the precursor-containing solids to dissolution is performed at a non-zero ratio of the solids to water, on mass basis, of less than about 1.

4. The manufacturing process of claim 1, wherein subjecting the precursor-containing solids to dissolution includes exposing the solids to acoustic perturbation at a frequency f in a range of about $2\ Hz \leq f \leq$ about 200 kHz.

5. The manufacturing process of claim 1, wherein subjecting the precursor-containing solids to dissolution is performed at a temperature less than about 100° C.

6. The manufacturing process of claim 1, wherein subjecting the precursor-containing solids to dissolution is performed at a pressure of about 1 atm.

7. The manufacturing process of claim 1, wherein subjecting the initial slurry to hydrothermal synthesis is performed at a pressure p in a range of about $0.1\ MPa \leq p \leq$ about 25 MPa.

8. The manufacturing process of claim 1, wherein subjecting the initial slurry to hydrothermal synthesis is performed at a temperature T in a range of about $20°\ C. \leq T \leq$ about 400° C.

9. The manufacturing process of claim 1, wherein subjecting the subsequent slurry to cementation includes combining an organic additive with the subsequent slurry.

10. The manufacturing process of claim 9, wherein combining the organic additive with the subsequent slurry is performed at a non-zero ratio of the organic additive to the siliceous solids, on mass basis, of about 1 or less.

11. The manufacturing process of claim 9, wherein the organic additive is a polymeric additive.

12. The manufacturing process of claim 1, wherein the siliceous solid comprises an aluminosilicate.

13. The manufacturing process of claim 12, wherein the siliceous solid is a zeolitic solid.

14. The manufacturing process of claim 13, wherein the aluminosilicate is selected from a hydrated alkali/alkaline aluminosilicate.

15. The manufacturing process of claim 13, wherein the aluminosilicate is selected from an amorphous hydrated aluminosilicate and a crystalline hydrated aluminosilicate.

16. A cemented siliceous solid formed by the manufacturing process of claim 1.

\* \* \* \* \*